(12) United States Patent
Takahashi et al.

(10) Patent No.: US 7,812,507 B2
(45) Date of Patent: Oct. 12, 2010

(54) PIEZOELECTRIC MOTOR AND CAMERA DEVICE

(75) Inventors: Hiroshi Takahashi, Yokohama (JP); Takahiro Kokubo, Zushi (JP); Osamu Nishimura, Kawasaki (JP); Toshikatsu Akiba, Kisarazu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 139 days.

(21) Appl. No.: 12/186,882

(22) Filed: Aug. 6, 2008

(65) Prior Publication Data

US 2009/0039734 A1     Feb. 12, 2009

(30) Foreign Application Priority Data

Aug. 8, 2007    (JP) .............................. 2007-206836

(51) Int. Cl.
*H01L 41/08* (2006.01)
(52) U.S. Cl. ..................................... 310/328
(58) Field of Classification Search .................. 310/328
See application file for complete search history.

(56) References Cited

U.S. PATENT DOCUMENTS

| | | | | |
|---|---|---|---|---|
| 5,696,421 | A * | 12/1997 | Zumeris et al. | 310/328 |
| 6,121,568 | A * | 9/2000 | Boccadoro et al. | 219/69.12 |
| 6,404,104 | B1 * | 6/2002 | Maeno et al. | 310/323.02 |
| 6,473,050 | B2 * | 10/2002 | Foncin | 343/754 |
| 7,274,131 | B2 * | 9/2007 | Li et al. | 310/328 |
| 2002/0024477 | A1 * | 2/2002 | Foncin | 343/909 |
| 2006/0133786 | A1 * | 6/2006 | Teramoto | 396/55 |
| 2008/0238249 | A1 | 10/2008 | Takahashi et al. | |
| 2008/0240704 | A1 | 10/2008 | Takahashi | |
| 2009/0058227 | A1 | 3/2009 | Takahashi et al. | |
| 2009/0297137 | A1 * | 12/2009 | Entis | 396/333 |

FOREIGN PATENT DOCUMENTS

| | | |
|---|---|---|
| JP | 05-203772 | 8/1993 |
| JP | 2000-059674 | 2/2000 |
| JP | 2002-101676 | 4/2002 |

* cited by examiner

*Primary Examiner*—Mark Budd
(74) *Attorney, Agent, or Firm*—Turocy & Watson, LLP

(57) ABSTRACT

A piezoelectric motor includes: a driven member having a substantially spherical shape; a base; a support member provided on the base; a gimbal frame that is provided on a periphery of the driven member; a first bearing that couples the gimbal frame to the support member to be rotatable around a first rotation axis; a second bearing that couples the driven member to the gimbal frame to be rotatable around a second rotation axis that is orthogonal to the first rotation axis; a plurality of piezoelectric elements, each of which has one end fixed onto the base and the other end disposed to be in contact with an actuation portion that abuts the driven member; and an elastic portion that is formed on the gimbal frame, the elastic portion being displaceable in a direction orthogonal to the first rotation axis and the second rotation axis.

14 Claims, 9 Drawing Sheets

PIEZOELECTRIC MOTOR AND CAMERA DEVICE

RELATED APPLICATION(S)

The present disclosure relates to the subject matter contained in Japanese Patent Application No. 2007-206836 filed on Aug. 8, 2007, which is incorporated herein by reference in its entirety.

FIELD

The present invention relates to a piezoelectric motor and a camera device that utilizing the piezoelectric motor.

BACKGROUND

Conventionally, in the field of an actuator controller system having a multi-degree-of-freedom in rotation, which is used for controlling orientation of a monitoring camera and for a joint mechanism of a robot, there has widely been used an actuator mechanism or a motor system with a configuration in which a plurality of single-degree-of-freedom type motors are serially stacked in multistage. From a viewpoint of a reduction in a size and an enhancement in accuracy, in some cases, there is employed a multi-degree-of-freedom type actuator mechanism or a multi-degree-of-freedom type motor system which has a support system using a gimbal mechanism or a joint mechanism and an actuator system using an electromagnetic motor provided separately form the support system. However, in a conventional actuator mechanism or motor system, the serial multistage stacking structure of the single-degree-of-freedom type motors serves as a basic configuration irrespective of the presence of the gimbal mechanism or the joint mechanism. Therefore, the conventional actuator controller system has a difficulty in simplifying its configuration. For example, although a motor in an uppermost stage can easily be moved, a motor in a lowermost stage is moved with difficulties due to a load applied thereon. Moreover, the reduction in the size of the apparatus is limited by the aforementioned configuration. For this reason, an actuator mechanism or a motor system which is to be used for the conventional actuator controller system cannot always satisfy the required design.

In consideration of the situation, in recent years, attention has been given to the research and development of a spherical piezoelectric motor using a piezoelectric element as an actuator for driving a spherical driven member. In particular, the piezoelectric motor that drives a sphere as a driven member by a frictional force using a piezoelectric unit has been expected as a spherical motor of a next generation having small-size and high accuracy. However, it is difficult in the spherical piezoelectric motor to detect rotating positions in horizontal and vertical planes of the driven member with a high resolution, and a large number of axes that need to be controlled are provided. For example, in the case in which a spherical piezoelectric motor is used in a monitoring camera which is necessary and sufficient for a biaxial control of an elevation angle and an azimuth, a uniaxial control is further required for compensating for a shift around a radial axis of the camera.

Therefore, there has been known an actuator mechanism employing a gimbal mechanism and having such a structure as to include a three-dimensional piezoelectric unit and the gimbal mechanism. For example, there has been proposed a digital camera for controlling a posture of an imaging unit supported to be vertically and transversely rotatable with respect to a direction of a front of a camera body. An example of such digital camera is disclosed in JP-A-200-059674. The digital camera has an actuator member that abuts on a semi-spherical surface of a unit body of the imaging unit, and a piezoelectric element is placed to four side surfaces of the actuator member. And, a stacking type piezoelectric element and an abutting piece are placed to an upper end face of the actuator member. A protrusion formed on the abutting piece abuts on the semispherical surface of the unit body so that the actuator member directly rotates and drives the unit body in each of the vertical and transverse directions.

However, the gimbal mechanism generally has a shaft misalignment caused by a manufacturing process or an assembling process. In a driven member having a spherical shape, particularly, the processing of a rotating bearing portion is difficult to perform and there is a tendency that the shaft alignment is apt to be generated. An actuating displacement of the piezoelectric element is very small and a frictional contact state of the driven member and the piezoelectric unit greatly varies by the influence of the shaft misalignment. As a result, the actuator characteristic of the piezoelectric motor becomes unstable in some cases.

Generally, an amount of the shaft misalignment is several tens of micrometers and a displacement of expansion and contraction of the piezoelectric element is several micrometers. Therefore, idle rotation is generated over the piezoelectric element due to the assembling error and the contact state becomes unstable so that there is a possibility that a characteristic to be expected might not be exhibited. In the case in which a driven surface takes a spherical surface, high accuracy in a processing is required for fabricating the gimbal mechanism in such a manner that two shaft centers are orthogonal to each other. In the case in which an actuator mechanism such as a motor is stacked to assemble the gimbal mechanism, high accuracy in an assembly is required in a biaxial direction for a degree of parallelism and an interval of the actuator mechanisms in upper and lower stages.

SUMMARY

According to a first aspect of the invention, there is provided a piezoelectric motor including: a driven member having a substantially spherical shape; a base; a support member that is provided on the base; a gimbal frame that is provided on a periphery of the driven member; a first bearing that couples the gimbal frame to the support member to be rotatable around a first rotation axis; a second bearing that couples the driven member to the gimbal frame to be rotatable around a second rotation axis that is orthogonal to the first rotation axis; a plurality of piezoelectric elements, each of which has one end fixed onto the base and the other end disposed to be in contact with an actuation portion that abuts the driven member; and an elastic portion that is formed on the gimbal frame, the elastic portion being displaceable in a direction orthogonal to the first rotation axis and the second rotation axis.

According to a second aspect of the invention, there is provided a piezoelectric motor including: a driven member having a substantially spherical shape; a base; a support member that is provided on the base; a gimbal frame that is provided on a periphery of the driven member; a first bearing that couples the gimbal frame to the support member to be rotatable around a first rotation axis; a second bearing that couples the driven member to the gimbal frame to be rotatable around a second rotation axis that is orthogonal to the first rotation axis; a plurality of piezoelectric elements, each of which has one end fixed onto the base and the other end disposed to be in contact with an actuation portion that abuts the driven member; and an elastic portion that is formed on the support member, the elastic portion being displaceable in a direction orthogonal to the first rotation axis and the second rotation axis.

According to a third aspect of the invention, there is provided a camera device including: a camera module that captures an image of an object and outputs image data; an actuator mechanism that rotates the camera module in a plurality of directions; and an actuator mechanism controller that controls the actuator mechanism, wherein the actuator mechanism includes: a driven member having a substantially spherical shape; a base; a support member that is provided on the base; a gimbal frame that is provided on a periphery of the driven member; a first bearing that couples the gimbal frame to the support member to be rotatable around a first rotation axis; a second bearing that couples the driven member to the gimbal frame to be rotatable around a second rotation axis that is orthogonal to the first rotation axis; a plurality of piezoelectric elements, each of which has one end fixed onto the base and the other end disposed to be in contact with an actuation portion that abuts the driven member; and an elastic portion that is formed on the gimbal frame, the elastic portion being displaceable in a direction orthogonal to the first rotation axis and the second rotation axis.

According to a fourth aspect of the invention, there is provided a camera device including: a camera module that captures an image of an object and outputs image data; an actuator mechanism that rotates the camera module in a plurality of directions; and an actuator mechanism controller that controls the actuator mechanism, wherein the actuator mechanism includes: a driven member having a substantially spherical shape; a base; a support member that is provided on the base; a gimbal frame that is provided on a periphery of the driven member; a first bearing that couples the gimbal frame to the support member to be rotatable around a first rotation axis; a second bearing that couples the driven member to the gimbal frame to be rotatable around a second rotation axis that is orthogonal to the first rotation axis; a plurality of piezoelectric elements, each of which has one end fixed onto the base and the other end disposed to be in contact with an actuation portion that abuts the driven member; and an elastic portion that is formed on the support member, the elastic portion being displaceable in a direction orthogonal to the first rotation axis and the second rotation axis.

DETAILED DESCRIPTION OF THE EMBODIMENTS

Figure 1A:
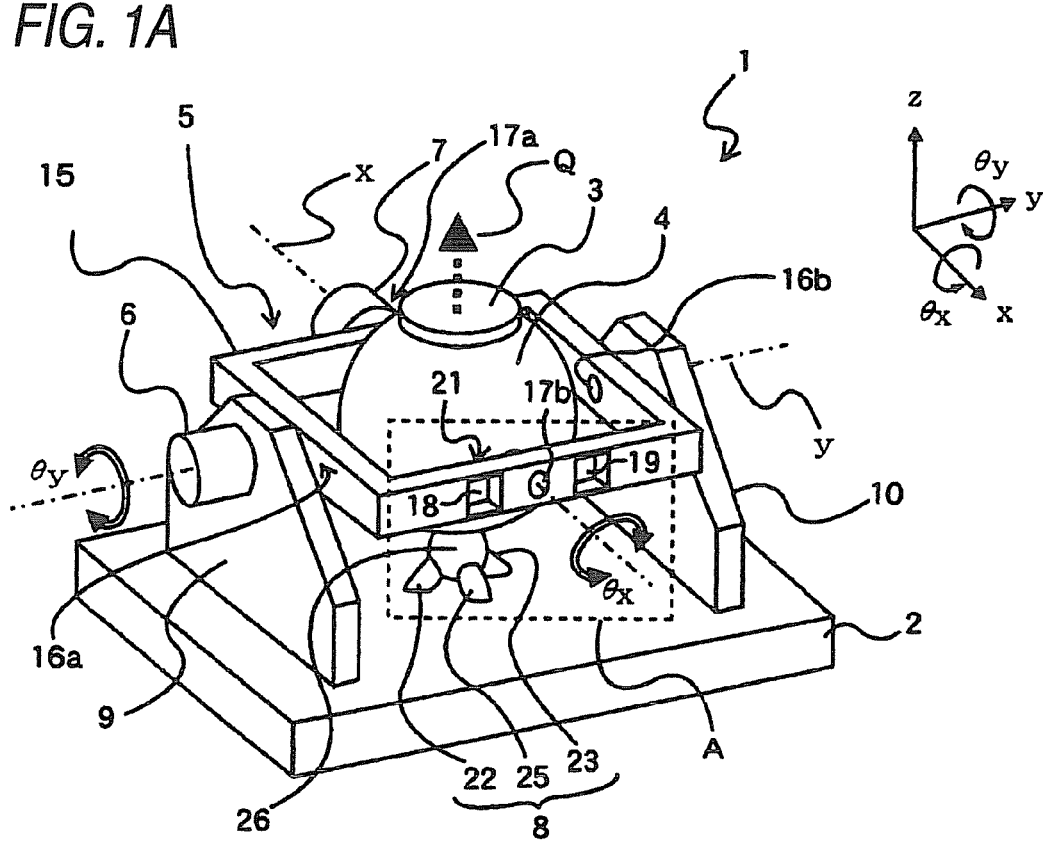
FIG. 1A is a perspective view showing a piezoelectric motor according to a first embodiment of the present invention.

A piezoelectric motor and a camera device mounting the piezoelectric motor according to embodiments of the present invention will be described below with reference to FIGS. 1A to 10. In the respective drawings, the same components are described with the same reference numerals, and repetitive description will be omitted.

First Embodiment

Figure 1B:
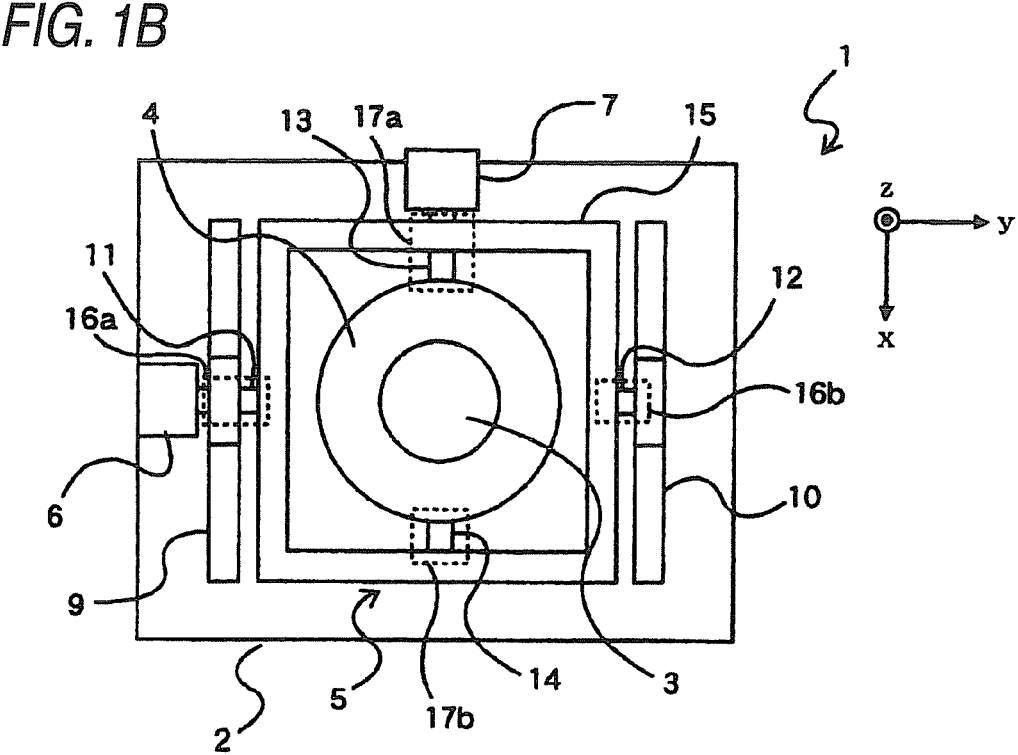
FIG. 1B is a top view showing the piezoelectric motor according to the first embodiment.
Figure 1C:
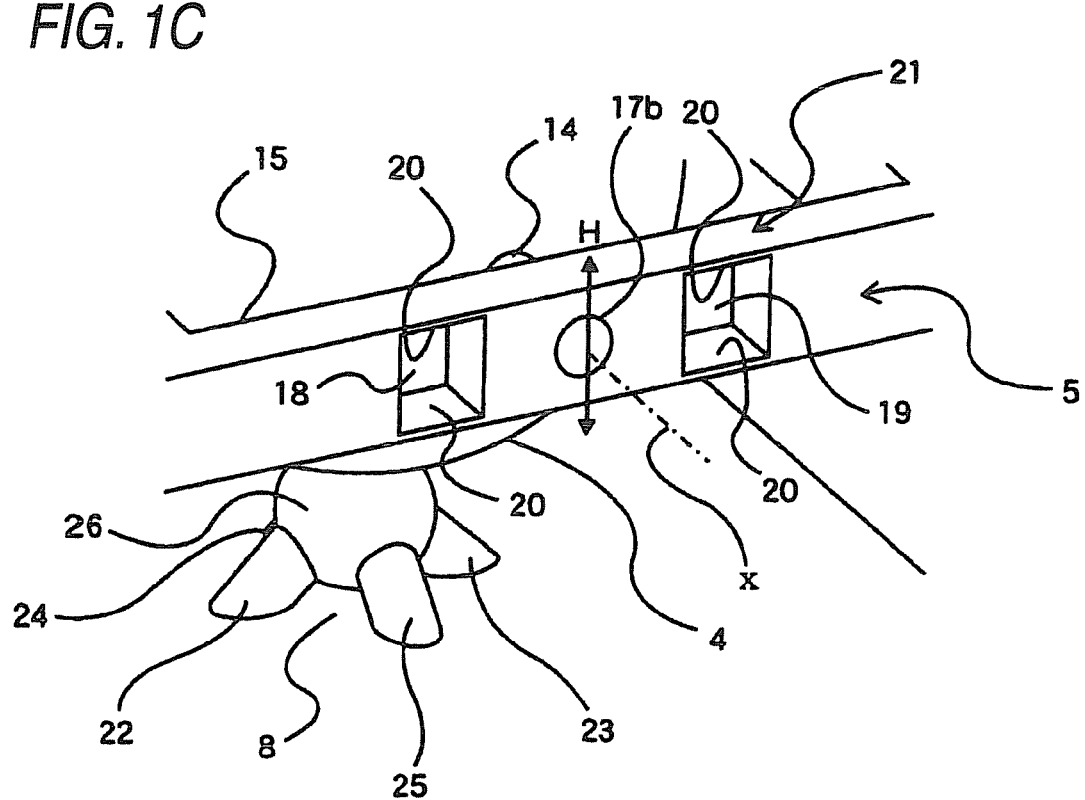
FIG. 1C is a partial enlarged view showing the piezoelectric motor according to the first embodiment.

FIG. 1A is a perspective view showing a piezoelectric motor according to a first embodiment of the present invention. FIG. 1B is a top view showing the piezoelectric motor according to the first embodiment. FIG. 1C is a partial enlarged view showing a portion surrounded by a dotted box A shown in FIG. 1A, and illustrates an example of a structure of a parallel leaf spring mechanism of the piezoelectric motor shown in FIG. 1A. A piezoelectric motor 1 includes: a base 2; a driven member 4 including a camera module 3 having a substantially spherical shape and having a visual line direction Q; and a gimbal mechanism 5 having a rotation axis y as a first rotation axis for rotatably supporting the driven member 4 and a rotation axis x as a second rotation axis which is disposed orthogonally to the rotation axis y. The gimbal mechanism 5 is provided on the base 2 and serves to support the driven member 4 to allow a 2-degree-of-freedom rotating motion. The piezoelectric motor 1 includes: an encoder 6 for measuring a rotation angle around the rotation axis y in the gimbal mechanism 5; an encoder 7 for measuring a rotation angle around the rotation axis x in the gimbal mechanism 5; and a three-dimensional piezoelectric unit 8 positioned below the driven member 4 on the base 2 and pressed and urged against a driven surface of the driven member 4 to frictionally drive the driven member 4.

The gimbal mechanism 5 includes: a pair of support members 9 and 10 that stand apart from each other in a direction of the rotation axis y on the base 2; and a gimbal frame 15 provided around the driven member 4. The gimbal frame 15 is received pivotally through the support members 9 and 10 and shafts 11 and 12 and also received pivotally through the driven member 4 and shafts 13 and 14. The gimbal frame 15 is a frame member having a substantially rectangular shape, and a pair of side frames opposed to each other in the gimbal frame 15 are provided with shaft holes for inserting the shafts 11 and 12 respectively, and the other pair of side frames opposed to each other are also provided with shaft holes for inserting the shafts 13 and 14 respectively. Bearing portions 16a and 16b which are concentric with the rotation axis y are configured by the shafts 11 and 12, the shaft holes of the support members 9 and 10, and the shaft holes of the gimbal frame 15. Both of the bearing portions 16a and 16b serve as first bearing. Bearing portions 17a and 17b which are concentric with the rotation axis x are configured by the shafts 13 and 14, the shaft holes provided on the driven member 4 and the shaft holes of the gimbal frame 15. Both of the bearing portions 17a and 17b serve as second bearing.

A body of the encoder 6 is provided on the support member 9, and a body of the encoder 7 is provided on the gimbal frame 15. As an example, the encoder 6 includes: a disk attached to an end of the shaft 11 and having a number of slits for transmitting and shielding a light which are formed in a circumferential direction; a light source for emitting a light on a slit of the disk; a light receiving device provided opposite to the light source with the disk interposed therebetween and serving to receive a light transmitted through the slit of the disk; and a signal processing circuit for outputting a pulse signal for calculating a rotation angle of the disk based on a pulse signal output from the light receiving device. A rotation angle θy of the gimbal frame 15 with respect to the support frame 9 is measured by the encoder 6. A structure of the encoder 7 is substantially the same with that of the encoder 6, and a rotation angle θx of the driven member 4 with respect to the gimbal frame 15 is measured by the encoder 7.

In the piezoelectric motor 1 according to the embodiment, a pair of windows 18 and 19 are formed to have predetermined shapes symmetrically with the bearing portion 17b interposed therebetween in a substantially parallel direction with the rotation axis x in the vicinity of the bearing portion 17b of the gimbal frame 15 in the gimbal mechanism 5. A leaf spring portion 20 is formed in upper and lower parts of the windows 18 and 19 respectively. The function of the four leaf spring portions 20 are implemented by an upper thin portion of the window 18, a lower thin portion of the window 18, an upper thin portion of the window 19 and a lower thin portion of the window 19, respectively. As a result, the four leaf spring portions 20 wholly constitute a parallel leaf spring mechanism 21. The parallel leaf spring mechanism 21 is flexed in a vertical direction with a movement in a vertical direction of the bearing portion 17b. The parallel leaf spring mechanism 21 has a low rigidity in an arrow direction shown by an arrow H in FIG. 1C and can elastically displace the bearing portion 17b in the vertical direction. More specifically, in the piezoelectric motor 1, an elastic portion for absorbing a vibration in the vertical direction of the rotation axis x is formed on a side frame along the rotation axis x in the gimbal frame 15. A specific structure of the parallel leaf spring mechanism 21 is varied depending on a material and a size of an apparatus structure, and a value of a desirable elastic modulus, and a suitable structure for each apparatus is employed in an actual design of the apparatus.

The three-dimensional piezoelectric unit 8 is configured by four piezoelectric elements 22, 23, 24 and 25 (the piezoelectric element 24 is not shown in FIG. 1A) each of which has one of ends fixed to the base 2, and a actuation portion 26 coupled and fixed to the other ends of the piezoelectric elements 22, 23, 24 and 25 and serving to transmit a driving force to the driven member 4 through a friction by composite vibrations of the piezoelectric elements 22 to 25. The piezoelectric elements 22 to 25 and the actuation portion 26 are coupled and fixed to each other through an adhesive, for example. The piezoelectric elements 22 to 25 have inclination axes which are inclined at a predetermined angle with respect to a perpendicular axis to a surface of the base 2 and are disposed equidistantly in a circumferential direction of a horizontal section of the driven member 4 in such a manner that the respective inclination axes cross each other on extended lines thereof. More specifically, the four piezoelectric elements 22 to 25 are disposed on the base 2 in such a manner that their neutral axes have intersection points.

The three-dimensional piezoelectric unit 8 has an AC power supply, a phase shift circuit, an electrode and a lead wire which are not shown. A sinusoidal voltage to be a reference is applied to any of the piezoelectric elements 22 to 25, and a sinusoidal voltage having an equal cycle to the sinusoidal voltage and a desirable phase difference is applied to the other piezoelectric elements.

The actuation portion 26 is caused to abut on the driven surface of the driven member 4 by a predetermined urging force along a z-axis line and performs a motion synthesized by the vibrations of the piezoelectric elements 22 to 25, thereby rotating the driven member 4 through a frictional force generated with the driven surface. In a state in which the actuation portion 26 abuts on the driven member 4, the actuation portion 26 performs an elliptic motion, a quick deforming motion or a linear motion in a predetermined direction so that the driven member 4 is rotated through the same motion.

In the case in which the actuation portion 26 is caused to perform the elliptic motion, a predetermined phase difference is made for the piezoelectric elements 22 to 25 respectively and a plurality of high frequency voltages based on a predetermined voltage command value is applied to excite the piezoelectric elements 22 to 25. In this state, the actuation portion 26 performs the elliptic motion in a predetermined direction so that the driven member 4 is driven through a frictional force. When the piezoelectric elements 22 to 25 expands and contracts slowly in the quick deforming motion, moreover, the driven member 4 to be frictionally driven by the actuation portion 26 is interlocked therewith and is stopped in a position obtained by a rotation in a predetermined amount. When the piezoelectric elements 22 to 25 contract and expand quickly, the actuation portion 26 is also moved rapidly. At this time, a slip is generated between the actuation portion 26 and the driven surface of the driven member 4. Therefore, the driven member 4 stays in that position. By the repetition of the expansion and contraction of the piezoelectric elements 22 to 25, the driven member 4 is rotated and driven. In the case in which the driven member 4 is rotated in a reverse direction, a speed of the expansion and contraction of the piezoelectric elements 22 to 25 is reversed. In the case in which the actuation portion 26 is caused to perform the linear motion, a phase of a voltage to be applied to the piezoelectric elements 22 to 25 is regulated to drive the actuation portion 26 in a linear direction.

Figure 2:
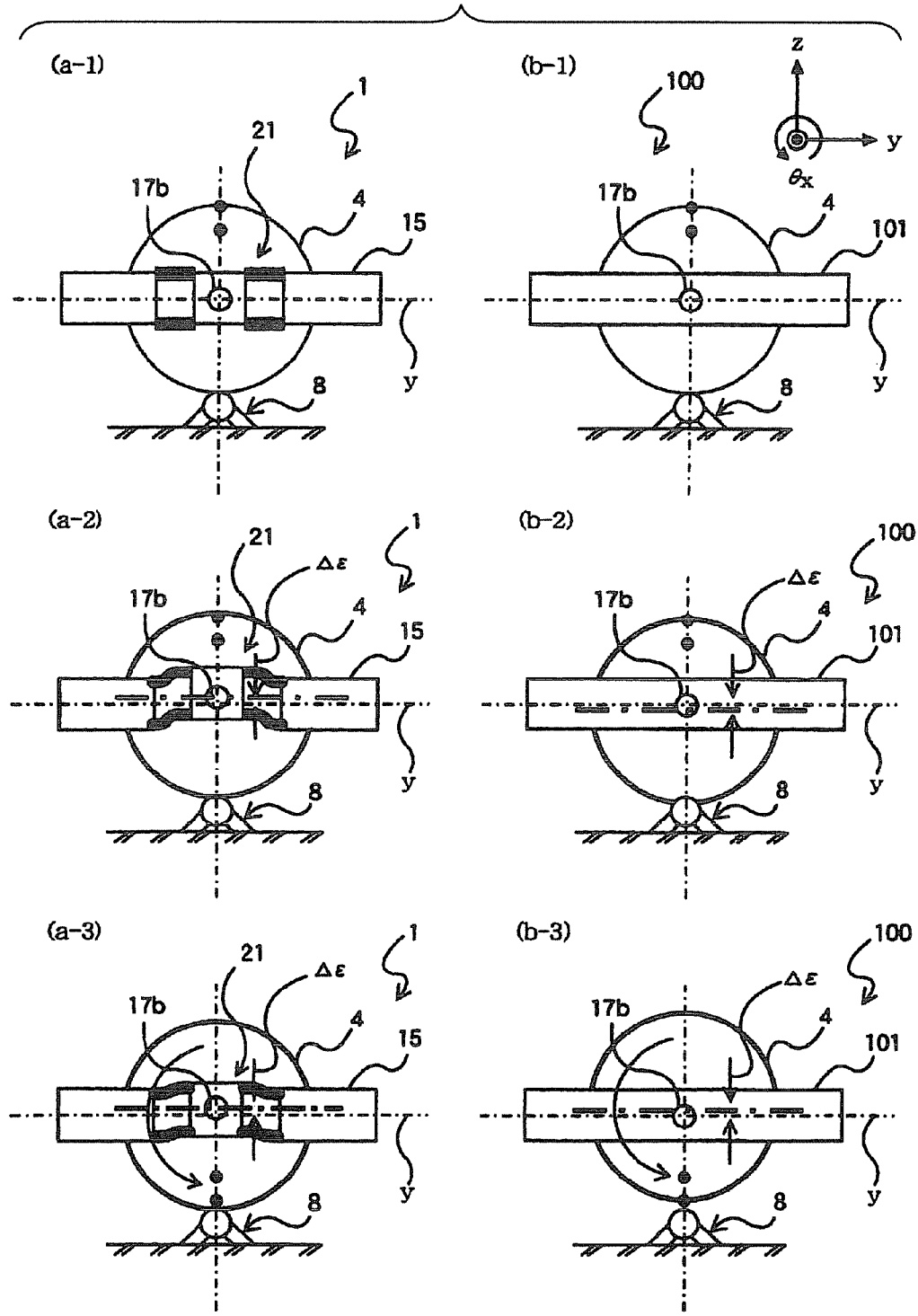
FIG. 2 is a view for explaining an operation of a parallel leaf spring mechanism of the piezoelectric motor according to the first embodiment.

Description will be given to an operation of the parallel leaf spring mechanism 21 together with an operation of the piezoelectric motor 1 according to the embodiment which has the structure. FIG. 2 is a view for explaining the operation of the parallel leaf spring mechanism 21. In FIG. 2, elements having the same reference numerals as those described above denote the same portions. Sections (a-1) to (a-3) shown in FIG. 2 are views showing states of the respective operations in the piezoelectric motor 1 and sections (b-1) to (b-3) are views showing states of respective operations in a conventional piezoelectric motor 100 which does not have the parallel leaf spring mechanism 21.

First of all, referring to the piezoelectric motor 1 according to the embodiment, section (a-1) shown in FIG. 2 shows an ideal state in which the rotation axis y and the bearing portion 17b are perfectly coincident with each other and a shaft misalignment is not generated. Referring to the conventional piezoelectric motor 100, similarly, section (b-1) shown in FIG. 2 shows an ideal state in which the rotation axis y and the bearing portion 17b are perfectly coincident with each other and the shaft misalignment is not generated. In the ideal state in which the shaft misalignment is not generated, a great difference in a driving characteristic is not made between the piezoelectric motor 1 according to the embodiment and the conventional piezoelectric motor 100. However, a slight shaft misalignment is actually generated due to an error caused by a processing error or an assembling error. In some cases, therefore, a piezoelectric motor having the shaft misalignment is manufactured.

Sections (a-2) and (b-2) shown in FIG. 2 show the states of the piezoelectric motor 1 and the piezoelectric motor 100 which have a shaft misalignment Δε. In the state shown in section (a-2) of FIG. 2, the bearing portion 17b is provided on the gimbal frame 15 through the parallel leaf spring mechanism 21. Therefore, the bearing portion 17b is elastically displaced above the gimbal frame 15 by the influence of the shaft misalignment. The shaft misalignment is absorbed by the elastic displacement. Therefore, a variation in urging force acting between the driven member 4 and the three-dimensional piezoelectric unit 8 is maintained to be small. Accordingly, a stable frictional driving operation can be expected. On the other hand, in the conventional piezoelectric motor 100 in a state shown in section (b-2) of FIG. 2, the bearing portion 17b is fixedly provided on the gimbal frame 101 and is not displaced with respect to the gimbal frame 101. Therefore, there is no portion in which the shaft misalignment is absorbed. As a result, an excessive urging force is generated between the driven member 4 and the three-dimensional piezoelectric unit 8 so that a frictional state greatly varies. When the frictional state is changed, a stability of the driving operation is deteriorated. For this reason, the expected driving characteristic cannot be obtained in some cases.

Furthermore, the piezoelectric motor 1 in a state shown in section (a-3) of FIG. 2 is brought into a state in which the driven member 4 is driven and rotated by 180 degrees from the state shown in section (a-2) of FIG. 2. In this case, the bearing portion 17b is elastically displaced by a smaller displacement than a displacement shown in section (a-2) of FIG. 2 above the gimbal frame 15 by the influence of the shaft misalignment. By the elastic displacement, the shaft misalignment is absorbed. Therefore, there is brought a state in which the variation in the urging force acting between the driven member 4 and the three-dimensional piezoelectric unit 8 is maintained to be small. In the same manner as in the state shown in section (a-2) of FIG. 2, consequently, it is possible to expect a stable frictional driving operation. On the other hand, in the piezoelectric motor 100 in the state shown in section (b-3) of FIG. 2, the driven member 4 is driven and rotated by 180 degrees from the state shown in section (b-2) of FIG. 2. In this case, the driven member 4 is separated from the three-dimensional piezoelectric unit 8 by the influence of the shaft misalignment so that the frictional driving operation does not function at all.

According to the piezoelectric motor 1 of the first embodiment, the driven member 4 is rotatably supported at a 2-degree-of-freedom by using the gimbal mechanism 5, and furthermore, the shaft misalignment caused by the processing error or the assembling error is absorbed by the parallel leaf spring mechanism 21. Even if the shaft misalignment is generated, therefore, it is possible to reduce a change in a frictional state. As a result, a stable frictional driving operation can be performed. It is desirable to design an elastic modulus $K_b$ of the parallel leaf spring mechanism 21 to satisfy the following expression (1), wherein an equivalent elastic modulus in an urging direction of the three-dimensional piezoelectric unit 8 is represented by $K_a$, an eccentric amount of a shaft misalignment is represented by Δε, and an allowable variation caused by the shaft misalignment of urging force between the three-dimensional piezoelectric unit 8 and the driven member 4 is represented by ΔF.

$$K_b \le \frac{1}{\left(\frac{\Delta \varepsilon}{\Delta F}\right) - \left(\frac{1}{K_a}\right)} \quad (1)$$

As described above, according to the piezoelectric motor 1, it is possible to reduce the size of the whole apparatus without providing a novel mechanism or member for absorbing the shaft misalignment. Even if the error is caused by the processing error or the assembling error over the bearing portions 16a and 16b and the bearing portions 17a and 17b or the shaft misalignment is generated between the rotation axis x and the rotation axis in the ideal state, moreover, it is possible to absorb the shaft misalignment by the elastic deformation of the elastic portion and to stably maintain the frictional state between the actuation portion 26 of the three-dimensional piezoelectric unit 8 and the driven member 4. In the driven member 4, at least a portion of an outer peripheral surface to which a driving force is transmitted from the actuation portion 26 is formed to take a spherical shape. Also in the case in which the processing error is made in the spherically processed portion, the error can be absorbed by the elastic deformation of the elastic portion and the frictional state between the actuation portion 26 and the driven member 4 can be maintained stably according to the piezoelectric motor 1 in accordance with the embodiment. As a result, even if a shaft alignment is generated in a predetermined amount with the rotating and driving operation of the driven member 4, it is absorbed so that the stable frictional driving operation can be achieved.

In addition, a rigidity of the elastic portion in the urging direction has a low rigidity and a rigidity in a different direction from the urging direction is high through the parallel leaf spring mechanism 21. Accordingly, the shaft misalignment generated in the urging direction is absorbed by the elastic deformation of the elastic portion so that it is possible to reduce an induction of a mechanically harmful vibration which is generated in the other direction. The mechanically harmful vibration is a structural resonance which is mainly generated with the driving operation of the three-dimensional piezoelectric unit 8. In other words, the direction of the elastic deformation is shifted to a transverse direction with difficulties through the four leaf spring portions 20.

When the support members 9 and 10 and the gimbal frame 15 are vibrated through the structural resonance so that the frictional state between the actuation portion 26 and the driven member 4 is changed, moreover, there is a possibility that the stable driving characteristic might not be ensured. According to the piezoelectric motor 1, however, it is possible to eliminate the cause for deterioration in the stability of the driving operation. In addition, the elastic portion is configured by the parallel leaf spring mechanism 21, and the parallel leaf spring mechanism 21 is formed monolithically with the gimbal frame 15 and the support members 9 and 10. Therefore, it is possible to reduce the size of the apparatus and to cause the apparatus to be compact, and to eliminate a variation in the characteristic which is caused by the assembling error and to eliminate an assembling step of precisely performing an alignment between necessary components for fastening respective components.

Variant of First Embodiment

Figure 3:
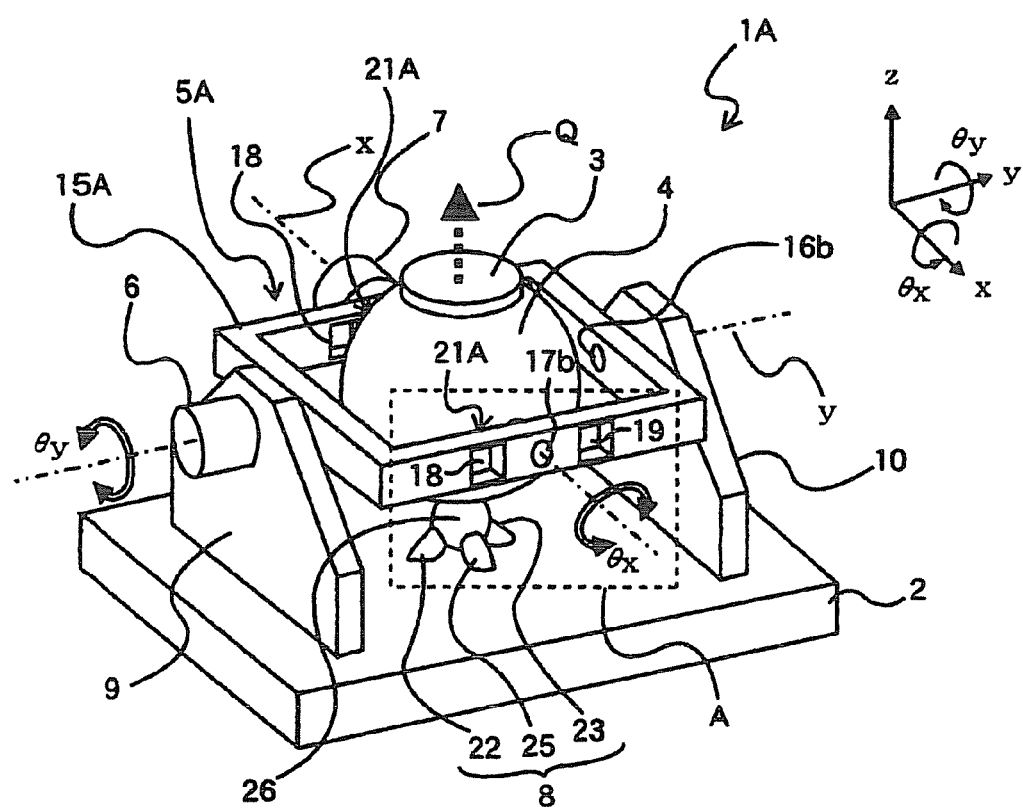
FIG. 3 is a perspective view showing a piezoelectric motor according to a variant of the first embodiment.

FIG. 3 is a perspective view showing a piezoelectric motor according to a variant of the first embodiment. A piezoelectric motor 1A according to the variant is provided with a gimbal frame 15A received pivotally by support members 9 and 10 and received pivotally by a driven member 4. Windows 18 and 19 are formed on a pair of side frames of the gimbal frame 15A which are opposed to each other along a rotation axis x respectively, and a parallel leaf spring mechanism 21A is configured by four leaf spring portions in upper and lower parts of the windows 18 and 19. The parallel leaf spring 21A is also provided on the side frames which are opposed to each other. More specifically, in the piezoelectric motor 1A, elastic portions are formed on the side frames which are opposed to each other in the gimbal frame 15A, respectively. The same reference numerals as those shown in FIG. 3 denote the same elements.

In the case in which a shaft misalignment is generated in the piezoelectric motor 1A according to the variant which has the structure, the parallel leaf spring mechanism 21A formed on one of the side frames is flexed in a vertical direction with a movement in the vertical direction of a bearing portion 17b, and the bearing portion 17b is elastically deformed in the vertical direction. Moreover, the parallel leaf spring mechanism 21A formed on the other side frame is flexed in the vertical direction with a movement in the vertical direction of a bearing portion 17a which is not shown, and the bearing portion 17a is elastically deformed in the vertical direction. Accordingly, a surface including the rotation axis x and a rotation axis y is moved in parallel in a direction along a vertical axis with respect to a base surface.

According to the piezoelectric motor 1A in accordance with the variant, two elastic portions are provided. Therefore, it is possible to reduce an inclination of the rotation axis x in a gimbal mechanism 5A. Therefore, it is possible to reduce a change in a frictional state between a actuation portion 26 of the three-dimensional piezoelectric unit 8 and the driven member 4 which is caused by the inclination of the gimbal mechanism 5A. Thus, it is possible to stabilize a driving characteristic. More specifically, urging force acts on the actuation portion 26 in a normal direction of an abutting portion, and furthermore, a frictional force is transmitted to the driven member 4 in such a manner that the frictional force is parallel with a rotating tangential direction.

Second Embodiment

Figure 4:
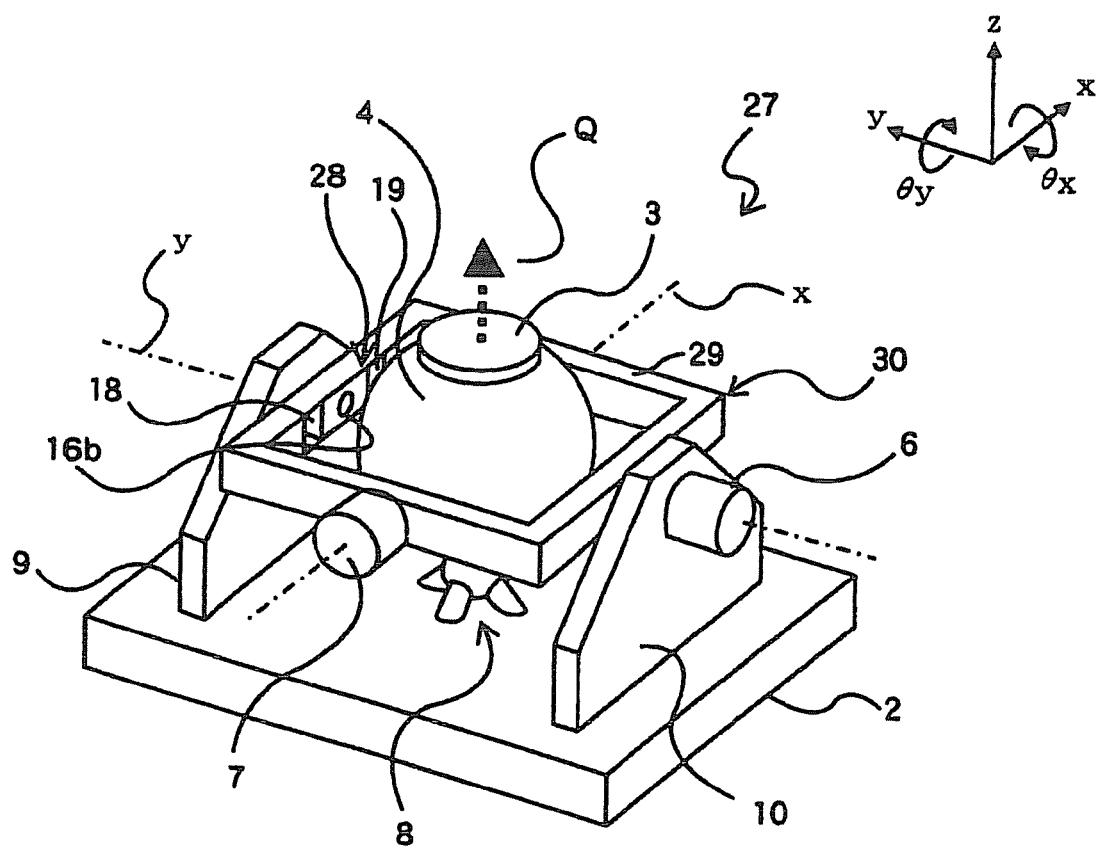
FIG. 4 is a perspective view showing a piezoelectric motor according to a second embodiment of the present invention.

FIG. 4 is a perspective view showing a piezoelectric motor according to a second embodiment of the invention. In FIG. 4, the same reference numerals as those shown in FIGS. 1A to 1C denote the same elements. Repetitive description for common portions to the piezoelectric motor 1 according to the first embodiment will be omitted. In the example of the first embodiment, there is employed the structure in which the piezoelectric motor 1 has the parallel leaf spring mechanism 21 provided on the gimbal frame 15 and the bearing portion 17b is elastically displaced in the vertical direction to absorb the shaft misalignment. However, a piezoelectric motor 27 according to the embodiment has a structure in which a parallel leaf spring mechanism 28 is provided on a gimbal frame 29 and a bearing portion 16b is elastically displaced in a vertical direction to absorb a shaft misalignment as shown in FIG. 4.

The piezoelectric motor 27 is configured by a base 2, a driven member 4, a gimbal mechanism 30 for supporting a 2-degree-of-freedom rotating motion of the driven member 4, encoders 6 and 7, and a three-dimensional piezoelectric unit 8. In the piezoelectric motor 27, windows 18 and 19 are formed in a substantially parallel direction with a rotation axis y symmetrically with the bearing portion 16b interposed therebetween in the vicinity of the bearing portion 16b provided on a left side frame of the gimbal frame 29. Thin portions in four places which are formed in upper and lower parts of the windows 18 and 19 function as four leaf spring portions, respectively. A parallel leaf spring mechanism 28 is wholly constituted by the four leaf spring portions. The parallel leaf spring mechanism 28 is flexed in a vertical direction with a movement in the vertical direction of the bearing portion 16 and rigidity is reduced in almost the vertical direction. Consequently, the bearing portion 16b can be displaced elastically in the vertical direction. Moreover, a gimbal mechanism 30 is configured by support members 9 and 10 and the gimbal frame 29.

In the case in which a shaft misalignment is generated in the piezoelectric motor 27 according to the embodiment which has the structure, the bearing portion 16b is elastically displaced in the vertical direction with respect to the gimbal frame 29 because the bearing portion 16b is disposed on the gimbal frame 29 through the parallel leaf spring mechanism 28. By the elastic displacement, the shaft misalignment is absorbed. Therefore, it is possible to perform a stable frictional driving operation in a state in which a variation in urging force acting between the driven member 4 and the three-dimensional piezoelectric unit 8 is maintained to be small. In a state in which the driven member 4 is rotated and driven by 180 degrees, moreover, the bearing portion 16b is elastically displaced by a variation in the shaft misalignment with respect to the gimbal frame 29 by the influence of the shaft misalignment. By the elastic displacement, the shaft misalignment is absorbed. Therefore, it is possible to perform a stable frictional driving operation in a state in which a variation in urging force acting between the driven member 4 and the three-dimensional piezoelectric unit 8 is maintained to be small.

According to the piezoelectric motor in accordance with the second embodiment of the invention, the elastic portion is formed on the side frame along the rotation axis y of the gimbal frame 29. Therefore, it is possible to absorb a vibration in the vertical direction of the rotation axis y.

Variant of Second Embodiment

Figure 5:
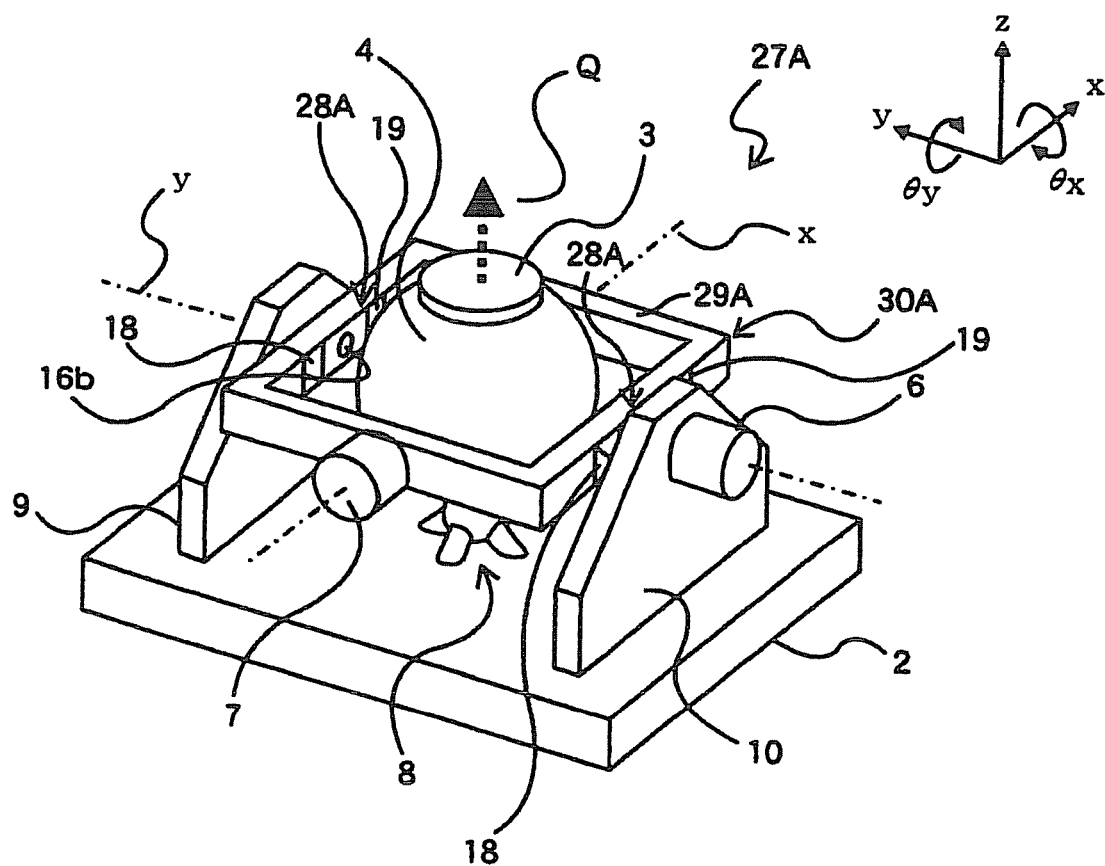
FIG. 5 is a perspective view showing a piezoelectric motor according to a variant of the second embodiment.

FIG. 5 is a perspective view showing a piezoelectric motor according to a variant of the second embodiment of the present invention. In a piezoelectric motor 27A according to the variant, windows 18 and 19 are formed on a pair of side frames of a gimbal frame 29A which are opposed to each other along a rotation axis y, respectively. A parallel leaf spring mechanism 28A is configured by four leaf spring portions in upper and lower parts of the windows 18 and 19. The parallel leaf spring mechanism 28A is also provided on side frames which are opposed to each other. More specifically, in the piezoelectric motor 27A, elastic portions are formed on side walls of the gimbal frame 29A which are opposed to each other respectively. The same reference numerals as those shown in FIG. 5 denote the same elements.

In the case in which a shaft misalignment is generated in the piezoelectric motor 27A according to the variant which has the structure, the parallel leaf spring mechanism 28A formed on one of the side frames is flexed in a vertical direction with a movement in the vertical direction of a bearing portion 16b, and the bearing portion 16b is elastically deformed in the vertical direction. Moreover, the parallel leaf spring mechanism 28A formed on the other side frame is flexed in the vertical direction with a movement in the vertical direction of a bearing portion 16a which is not shown, and the bearing portion 16a is elastically deformed in the vertical direction. Accordingly, a surface including the rotation axis x and a rotation axis y is moved in parallel in a direction along a vertical axis with respect to a surface of a base 2.

According to the piezoelectric motor 27A in accordance with the variant, it is possible to absorb a vibration in the vertical direction of the rotation axis y, and furthermore, two elastic portions are provided. Therefore, it is possible to reduce a change in a frictional state between a actuation portion 26 of a three-dimensional piezoelectric unit 8 and a driven member 4 which is caused by an inclination of a gimbal mechanism 30A. Thus, it is possible to stabilize a driving characteristic.

Third Embodiment

Figure 6:
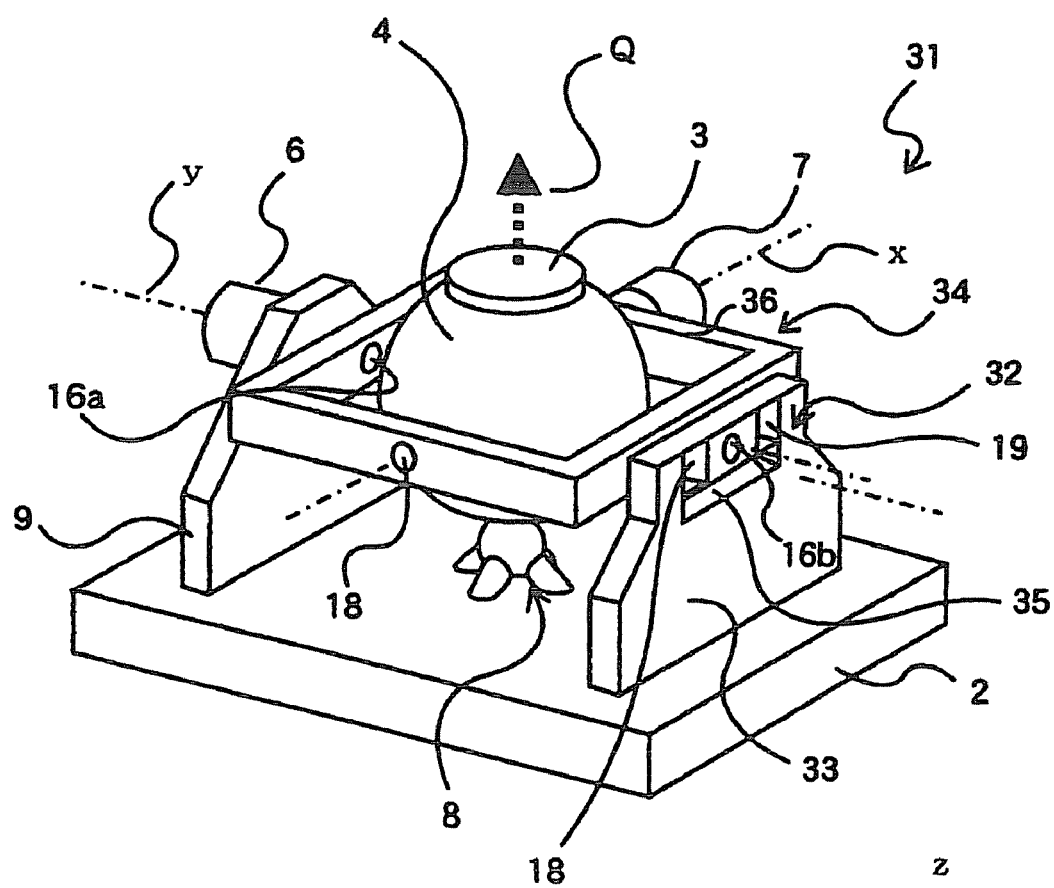
FIG. 6 is a perspective view showing a piezoelectric motor according to a third embodiment of the present invention.
Figure 6:
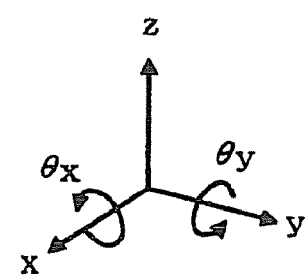

FIG. 6 is a perspective view showing a piezoelectric motor according to a third embodiment of the invention. In FIG. 6, the same reference numerals as those shown in FIGS. 1A to 1C denote the same elements. Repetitive description for common portions to the piezoelectric motor 1 and the piezoelectric motor 27 will be omitted. In the examples of the first and second embodiments, there is employed the structure in which the piezoelectric motors 1 and 27 have the parallel leaf spring mechanisms 21 and 28 provided on the gimbal frames 15 and 29 respectively. However, a piezoelectric motor 31 according to the embodiment has a structure in which a parallel leaf spring mechanism 32 is provided on a support member 33 and a bearing portion 16b is elastically displaced in a vertical direction to absorb a shaft misalignment.

The piezoelectric motor 31 is configured by a base 2, a driven member 4, a gimbal mechanism 34 for supporting a 2-degree-of-freedom rotating motion of the driven member 4, encoders 6 and 7, and a three-dimensional piezoelectric unit 8. In the piezoelectric motor 31, windows 18 and 19 are formed in a substantially parallel direction with a rotation axis y symmetrically with the bearing portion 16b interposed therebetween in the vicinity of the bearing portion 16b provided on the support member 33, and a void 35 is formed in lower parts of the windows 18 and 19. Thin portions in four places which are formed in upper and lower parts of the windows 18 and 19 function as four leaf spring portions respectively, and the parallel plate spring mechanism 32 is wholly constituted by the four leaf spring portions. The parallel leaf spring mechanism 32 is flexed in a vertical direction with a movement in the vertical direction of the bearing portion 16b and a rigidity is reduced in almost the vertical direction. Consequently, the bearing portion 16b can be displaced elastically in the vertical direction. Moreover, a gimbal mechanism 34 is configured by support members 9 and 33 and a gimbal frame 36.

In the case in which a shaft misalignment is generated in the piezoelectric motor 31 according to the embodiment which has the structure, the bearing portion 16b is elastically displaced in the vertical direction with respect to the gimbal frame 36. By the elastic displacement, the shaft misalignment is absorbed. Therefore, it is possible to perform a stable frictional driving operation in a state in which a variation in urging force acting between the driven member 4 and the three-dimensional piezoelectric unit 8 is maintained to be small. In a state in which the driven member 4 is rotated and driven by 180 degrees, moreover, the bearing portion 16b is elastically displaced by a variation in the shaft misalignment with respect to the gimbal frame 36. By the elastic displacement, the shaft misalignment is absorbed. Therefore, it is possible to perform a stable frictional driving operation in a state in which a variation in urging force acting between the driven member 4 and the three-dimensional piezoelectric unit 8 is maintained to be small.

According to the piezoelectric motor in accordance with the embodiment of the invention, it is also possible to absorb a vibration in the vertical direction of the rotation axis y by the elastic portion formed on the support member 33 stationary provided on the base 2.

In the case in which the parallel leaf spring mechanism 32 can be provided on a support member 9 at a left side without damaging a function of the encoder 6, moreover, it is also possible to provide a leaf spring portion on the support member 9. In this case, the support member 9 has a structure in which the windows 18 and 19 are formed in a substantially parallel direction with the rotation axis y symmetrically with a bearing portion 16a interposed therebetween in the vicinity of the bearing portion 16a and a cavity is formed in lower parts of the windows 18 and 19. Thin portions in four places which are formed in upper and lower parts of the windows 18 and 19 function as four leaf spring portions respectively, and the same parallel leaf spring mechanism as the parallel leaf spring mechanism 32 is configured by the four leaf spring portions. Also in this case, it is possible to absorb the vibration in the vertical direction of the rotation axis y.

Moreover, the parallel leaf spring mechanism 32 may be formed on both the support member 9 and the support member 33. Thus, it is possible to absorb the vibration in the vertical direction of the rotation axis y, and furthermore, to reduce a change in a frictional state between a actuation portion 26 of the three-dimensional piezoelectric unit 8 and the driven member 4 which is caused by an inclination of a gimbal mechanism 34 through two elastic portions. Consequently, it is possible to stabilize a driving characteristic.

Fourth Embodiment

Figure 7:
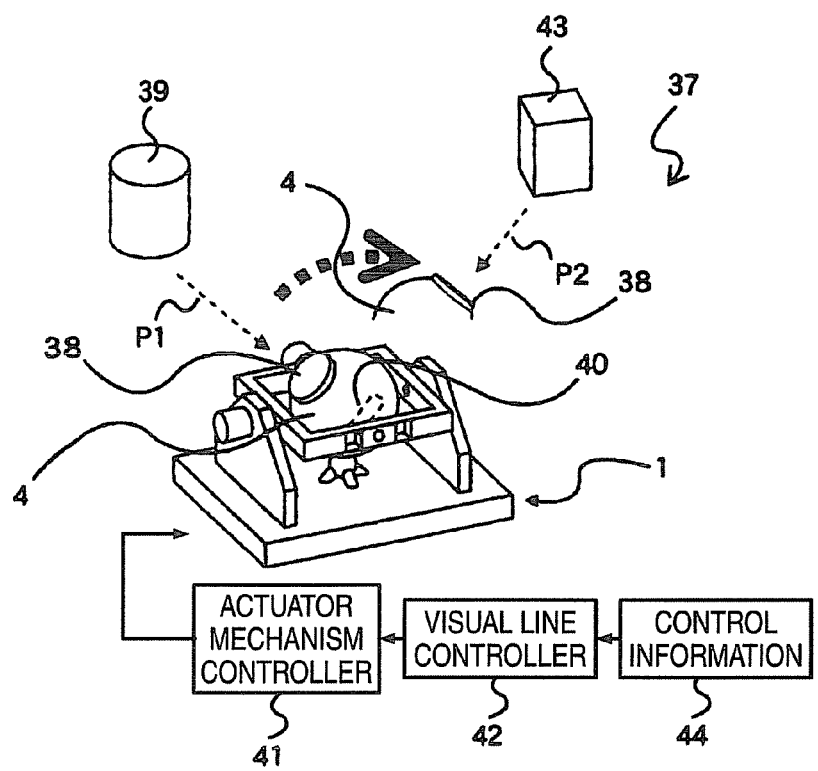
FIG. 7 is a view showing a main part of a camera device according to a fourth embodiment of the present invention.

FIG. 7 is a view showing a main part of a camera device according to a fourth embodiment of the present invention. In the fourth embodiment, description will be given to a camera device mounting a piezoelectric motor 1 as a actuator mechanism. In FIG. 7, the same reference numerals as those described above denote the same elements. Repetitive description for common portions to the piezoelectric motor 1 according to the first embodiment will be omitted.

A camera device 37 according to the fourth embodiment includes a camera module 38 mounting a driven member 4, an imaging portion (not shown) for forming an image of an object light of an object 39 onto an image sensor 40 of the camera module 38, photoelectrically converting a subject image which is formed and outputting image information, the piezoelectric motor 1 for rotating the camera module 38 in a direction an elevation angle and rotating the camera module 38 in a direction of an azimuth, actuator mechanism controller 41 for controlling a rotating and driving operation of the piezoelectric motor 1, and visual line controller 42 for controlling a change in a radial direction of the camera module 38. The imaging portion is configured by a large number of imaging elements for photoelectrically converting a subject image to output an imaging signal and a signal processing circuit for processing the imaging signal to generate an image signal. The actuator mechanism controller 41 controls a driving voltage to be applied to piezoelectric elements 22 to 25 based on control information output from the visual line controller 42.

The camera module 38 serves as a camera module that captures an image of the object 39 and outputs image data (image information).

As described above, the piezoelectric motor 1 can directly drive the driven member 4 through two rotating shafts. Therefore, it is possible to perform a regulation in the directions of the elevation angle and azimuth of the camera module 38. Consequently, the camera device 37 according to the embodiment photographs the object 39 through the camera module 38 and leads an object light P1 from the object 39 to the camera module 38, and forms an image of the object light P1 thus led on the image sensor 40 of the camera module 38.

According to the configuration, an operation for switching the radial direction of the camera module 38 from the object 39 to an object 43 is performed in accordance with the following procedure. An operator inputs control information 44 about the object 43 to control information input means which is not shown. When the control information 44 about the directions of the elevation angle and azimuth of the camera module 38 is given to the visual line controller 42 through the control information input means, the visual line controller 42 generates an operating signal for operating each of the piezoelectric elements 22 to 25 of a three-dimensional piezoelectric unit 8 in the piezoelectric motor 1 based on the control information 44. The operating signal is input to the actuator mechanism controller 41, and the actuator mechanism controller 41 generates a signal for operating each of the piezoelectric elements 22 to 25. In response to the signal, a plurality of sine wave signals having phase differences respectively is input to the piezoelectric elements 22 to 25 so that the driven member 4 is driven, for example. As a result, the radial direction of the camera module 38 is switched into the object 43. The camera device photographs the object 43 through the camera module 38 and leads an object light P2 from the object 43 to the camera module 38, and forms an image of the object light P2 on the image sensor 40 of the camera module 38.

According to the camera device 37 in accordance with the fourth embodiment, it is possible to achieve a two-degree-of-freedom direct driving operation of the camera module 38 and a reduction in a weight of the driven member 4 including the camera module 38 at the same time, and to expect an implementation of an increase in a speed of visual line change setting and an enhancement in accuracy of a position control. As a result, it is possible to enhance a performance of a visual line changing function of the camera device 37, and furthermore, to reduce a size of the camera device 37 and to cause the camera device 37 to be compact.

The camera device 37 according to the embodiment may include the piezoelectric motor 1A, 27, 27A or 31 in place of the piezoelectric motor 1. Consequently, it is possible to perform the two-degree-of-freedom direct driving operation and to reduce a weight in the same manner.

Fifth Embodiment

Figure 8:
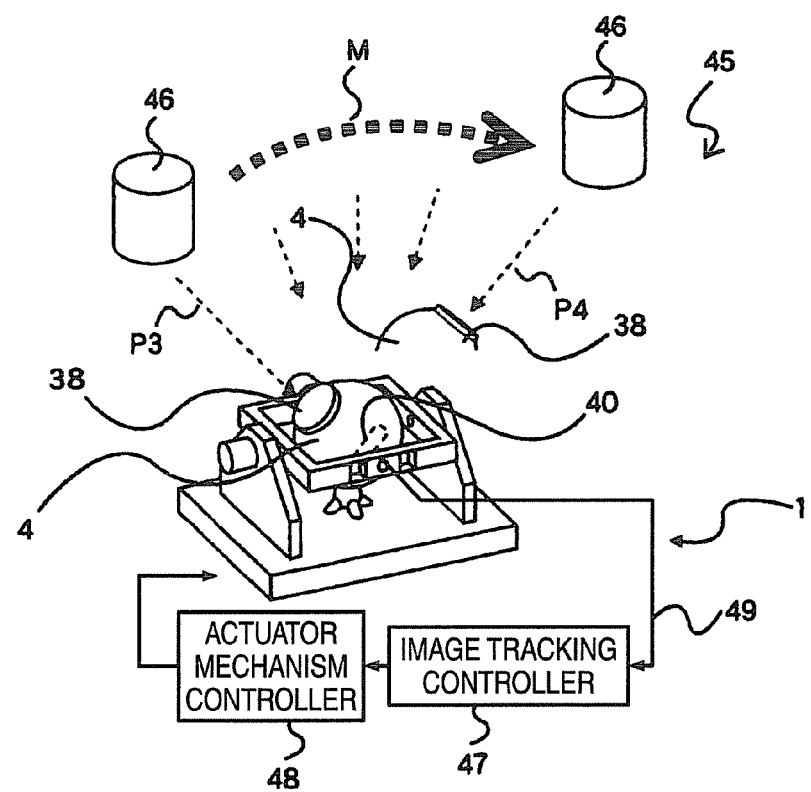
FIG. 8 is a view showing a main part of a camera device according to a fifth embodiment of the present invention.

FIG. 8 is a view showing a main part of a camera device according to a fifth embodiment of the present invention. A camera device 45 according to the fifth embodiment includes a camera module 38 mounting a driven member 4, image tracking controller 47 for controlling a radial direction of the camera module 38 following a movement of an object 46 based on image information output from an imaging portion which is not shown, and actuator mechanism controller 48 for controlling a piezoelectric motor 1 based on control information output from the image tracking controller 47. The other elements shown in FIG. 8 and having the same reference numerals as those described above represent the same portions.

The camera device 45 according to the embodiment which has the structure photographs an object 46 through a camera module 38 and leads an object light P3 reflected from the object 46 to the camera module 38, and forms an image on an image sensor 40 of the camera module 38. The image tracking controller 47 generates an operating signal for causing the radial direction of the camera module 38 to follow the object 46 in a moving state M of the object 46 based on image information 49 transferred from an imaging portion, that is, an operating signal for operating each of piezoelectric elements 22 to 25 of a three-dimensional piezoelectric unit 8 in the piezoelectric motor 1. The operating signal is input to the actuator mechanism controller 48, and the actuator mechanism controller 48 operates each of the piezoelectric elements 22 to 25, thereby driving the driven member 4. As a result, the radial direction of the camera module 38 follows the movement of the object 46. The camera device 45 photographs the object 46 placed in a position obtained after the movement, leads an object light P4 reflected from the object 46 to the camera module 38 and forms an image on the image sensor 40 of the camera module 38.

According to the camera device 45 in accordance with the embodiment of the invention, it is possible to perform a two-degree-of-freedom direct driving operation using the piezoelectric motor 1 and to reduce a weight of the driven member 4 including the camera module 38. Consequently, it is possible to increase a speed of the operation for following the movement of the object 46 and to control a position of the camera module 38 with high accuracy. Moreover, it is possible to enhance a performance of a function of tracking an object image possessed by the camera device 45, thereby implementing a reduction in a size and compactness in the camera device 45.

The camera device 45 according to the fifth embodiment may include the piezoelectric motor 1A, 27, 27A or 31 in place of the piezoelectric motor 1. Consequently, it is possible to perform the two-degree-of-freedom direct driving operation and to reduce a weight in the same manner.

Sixth Embodiment

Figure 9:
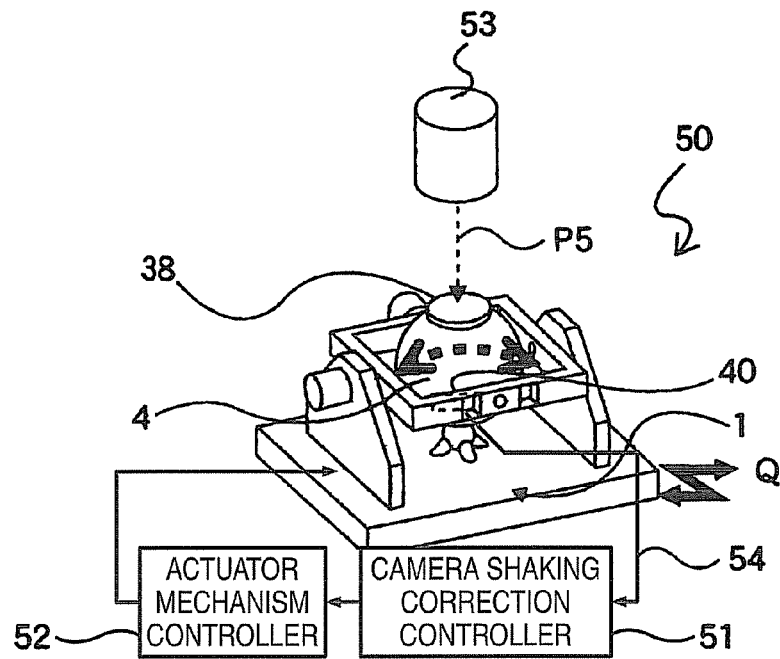
FIG. 9 is a view showing a main part of a camera device according to a sixth embodiment of the present invention.

FIG. 9 is a view showing a main part of a camera device according to a sixth embodiment of the present invention. A camera device 50 according to the sixth embodiment includes a camera module 38 mounting a driven member 4, camera shaking correction controller 51 for controlling a rotation amount of each of components in vertical and horizontal directions of the camera module 38 based on image information output from an imaging portion which is not shown or information of a sensor for measuring a camera shaking vibration, and actuator mechanism controller 52 for controlling a piezoelectric motor 1 based on control information output from the camera shaking correction controller 51.

The camera shaking correction controller 51 is configured by an angular velocity sensor for detecting an angular velocity of the camera module 38 through camera shaking and other vibrations or image processor for detecting a motion vector of the image information, and means for calculating a control amount based on an output of the angular velocity sensor or the detector and inputting a control signal to the actuator mechanism controller 52. The actuator mechanism controller 52 moves a lens and an image sensor 40 of the camera module 38 based on the control signal. The other elements shown in FIG. 9 and having the same reference numerals described above represent the same portions.

The camera device 50 according to the sixth embodiment which has the structure photographs an object 53 through the camera module 38 and leads an object light P5 reflected from the object 53 to the camera module 38, and forms an image on an image sensor 40 of the camera module 38. The camera shaking correction controller 51 acquires an image oscillating state Q of the object 53 based on image information 54 which is photographed and controls a driving operation of the camera module 38 in the vertical and horizontal directions, thereby suppressing image shaking. Furthermore, the camera device 50 generates an operating signal for canceling the camera shaking vibration, that is, an operating signal for operating each of piezoelectric elements 22 to 25 of a three-dimensional piezoelectric unit 8 in the piezoelectric motor 1. The operating signal is input to the actuator mechanism controller 52, and the actuator mechanism controller 52 operates each of the piezoelectric elements 22 to 25 to drive the driven member 4. As a result, the camera module 38 can obtain a clear image having less shaking.

The camera device 50 acquires the image shaking state Q by using the image information 54 and obtains the operating signal for canceling a vibration amount of the camera shaking. However, it is also possible to employ a structure in which a sensor for measuring the camera shaking vibration amount is separately disposed on a body of the camera device 50 to obtain the operating signal for canceling the camera shaking vibration amount based on information output from the sensor. In addition, it is also possible to employ a structure in which the operating signal for canceling the camera shaking vibration amount is obtained based on both the image information 54 and the information output from the sensor for measuring the camera shaking vibration amount.

According to the camera device 50 in accordance with the embodiment of the invention, it is possible to perform a camera shaking correction using the piezoelectric motor 1 and to reduce a weight of the driven member 4 including the camera module 38.

The camera device 50 according to the sixth embodiment may include the piezoelectric motor 1A, 27, 27A or 31 in place of the piezoelectric motor 1. Consequently, it is possible to perform the camera shaking correction and to reduce the weight in the same manner.

Seventh Embodiment

Figure 10:
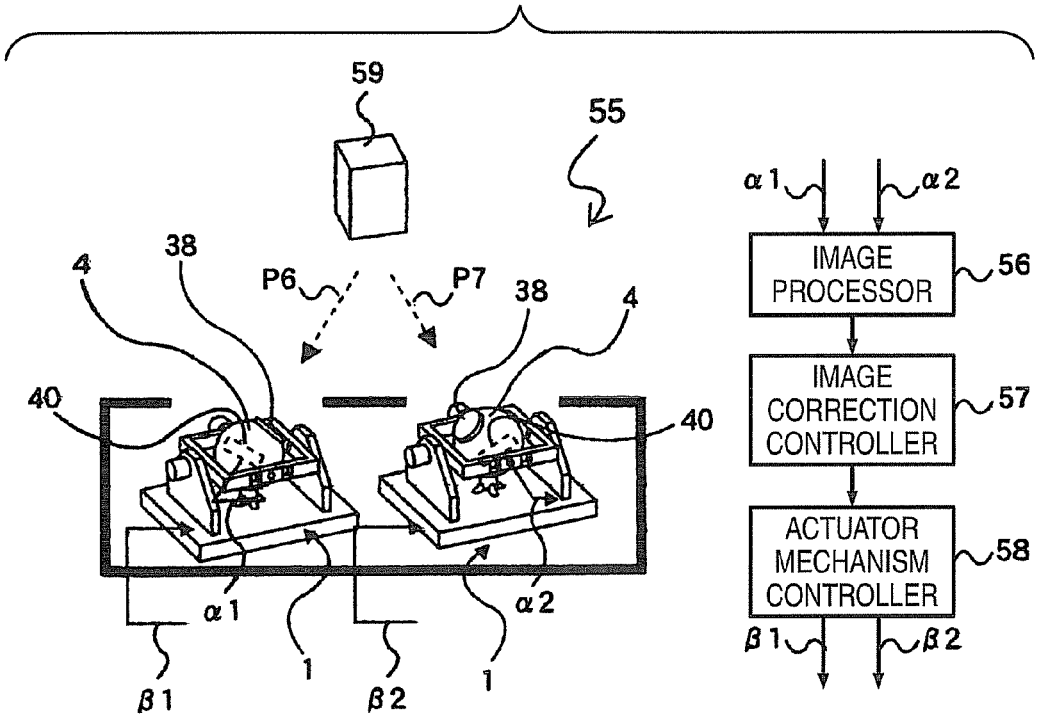
FIG. 10 is a view showing a main part of a camera device according to a seventh embodiment of the present invention.

FIG. 10 is a view showing a main part of a camera device according to a seventh embodiment of the present invention. A camera device 55 according to the seventh embodiment has two piezoelectric motors 1 provided side by side. The camera device 55 includes two piezoelectric motors 1 mounting camera modules 38 on driven members 4, and image processor 56 for generating a three-dimensional image from image information for the same observed object photographed with a slightly different parallax through the two camera modules 38 and outputting the three-dimensional image. Furthermore, the camera device 55 includes image correction controller 57 for performing a correction, for example, a fine regulation in each of the vertical and horizontal directions for the three-dimensional image, and actuator mechanism controller 58 for controlling the two piezoelectric motors 1 based on control information output from the image correction controller 57. The other elements shown in FIG. 10 and having the same reference numerals represent the same portions.

The camera device 55 according to the seventh embodiment is configured to capture an image of an object 59 through the two camera modules 38 which are provided side by side, leads an object light P6 from the object 59 through one of the camera modules 38 and forms an image on an image sensor 40 of the camera module 38. The camera device 55 leads an object light P7 from the object 59 to the other camera module 38 and forms an image on the image sensor 40 of the camera module 38. The camera device 55 inputs images $\alpha 1$ and $\alpha 2$ of the respective image sensors 40 to the image processor 56, thereby generating a three-dimensional image. In other words, the camera device 55 obtains the three-dimensional image by the images $\alpha 1$ and $\alpha 2$ transmitted in two directions having a parallax in a horizontal direction. The image correction controller 57 analyzes the three-dimensional image obtained by the image processor 56 to define an operating signal for finely regulating a shift in a vertical direction which is caused by a zooming operation or focusing of the two camera modules 38 in addition to a fine regulation for providing a proper three-dimensional image to an observer, that is, a fine regulation in the horizontal direction. The operating signal serves to operate each of piezoelectric elements 22 to 25 of a three-dimensional piezoelectric unit 8 in the piezoelectric motor 1. The operating signal is input to the actuator mechanism controller 58 to operate each of the piezoelectric elements 22 to 25, thereby driving the driven member 4 based on signals $\beta 1$ and $\beta 2$ output from the actuator mechanism controller 58.

According to the camera device 55 in accordance with the seventh embodiment, it is possible to perform a parallax regulation and a shift correction in the vertical direction at a high speed and to execute the shift correction with high accuracy. Consequently, it is possible to always provide an excellent three-dimensional image. As compared with a conventional two-degree-of-freedom type actuator mechanism using a pan-tilt mechanism capable of performing a rotating and driving operation in each of horizontal and vertical directions, moreover, moreover, it is possible to expect a reduction in a size of the whole camera device 55 and a compactness thereof.

In the conventional camera device having the function of generating a stereoscopic image, in the case in which two enlarged images which mutually have parallaxes are generated through a zooming control, they are shifted in a longitudinal direction. It is very difficult for the conventional camera device to regulate a positional relationship between the two enlarged images in order for an operator to enable a stereovision accurately. On the other hand, according to the camera device 55 in accordance with the embodiment, a posture control in a horizontal direction and a direction of an elevation angle can be performed with a compact structure.

Although the parallel leaf spring mechanism is provided in the vicinity of the central part in the longitudinal direction of the side frame of the gimbal frame in each of the embodiments and the variants, it is possible to properly provide the parallel leaf spring mechanism in any position other than the central part in the longitudinal direction of the side frame of the gimbal frame 15 in order to prevent the rotating and driving operation of the driven member 4 from being disturbed.

While the bearing portion 16a that serves as the first bearing has the structure in which the outer peripheral portion of the shaft 11 slides along the inner peripheral surface of the shaft hole, the bearing portion 16a may be constituted by the shaft 11 and a rolling member which covers the outer peripheral portion of the shaft 11 and enables a rolling operation along the inner peripheral surface of the shaft hole. The bearing portion 16b that serves as the first bearing can also be constituted by the shaft hole, the shaft 12 and the rolling member. In the embodiment, the functions of each of the actuator mechanism controller 41, the visual line controller 42, the image tracking controller 47, the actuator mechanism controller 48, the image processor 56, the image correction controller 57 and the actuator mechanism controller 58 is implemented by a CPU, an ROM and an RAM.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. A piezoelectric motor comprising:
a driven member having a substantially spherical shape;
a base;
a support member that is provided on the base;
a gimbal frame that is provided on a periphery of the driven member;
a first bearing that couples the gimbal frame to the support member to be rotatable around a first rotation axis;
a second bearing that couples the driven member to the gimbal frame to be rotatable around a second rotation axis that is orthogonal to the first rotation axis;
a plurality of piezoelectric elements, each of which has one end fixed onto the base and the other end disposed to be in contact with an actuation portion that abuts the driven member; and
an elastic portion that is formed on the gimbal frame, the elastic portion being displaceable in a direction orthogonal to the first rotation axis and the second rotation axis.

2. The motor according to claim 1, wherein the elastic portion is formed to have a higher rigidity in the first rotation axis and the second rotation axis than in the direction orthogonal to the first rotation axis and the second rotation axis.

3. The motor according to claim 2, wherein the elastic portion is monolithically formed on the gimbal frame as a parallel leaf spring mechanism having upper and lower thin portions of a pair of window portions formed on both sides of at least one of the first bearing and the second bearing, the parallel leaf spring mechanism being flexibly bendable in accordance with a displacement of the first bearing or the second bearing in the direction orthogonal to the first rotation axis and the second rotation axis.

4. A piezoelectric motor comprising:
a driven member having a substantially spherical shape;
a base;
a support member that is provided on the base;
a gimbal frame that is provided on a periphery of the driven member;
a first bearing that couples the gimbal frame to the support member to be rotatable around a first rotation axis;
a second bearing that couples the driven member to the gimbal frame to be rotatable around a second rotation axis that is orthogonal to the first rotation axis;
a plurality of piezoelectric elements, each of which has one end fixed onto the base and the other end disposed to be in contact with an actuation portion that abuts the driven member; and
an elastic portion that is formed on the support member, the elastic portion being displaceable in a direction orthogonal to the first rotation axis and the second rotation axis.

5. The motor according to claim 4, wherein the elastic portion is formed to have a higher rigidity in the first rotation axis and the second rotation axis than in the direction orthogonal to the first rotation axis and the second rotation axis.

6. The motor according to claim 5, wherein the elastic portion is monolithically formed on the support member as a parallel leaf spring mechanism having upper and lower thin portions of a pair of window portions formed on both sides of the first bearing, the parallel leaf spring mechanism being flexibly bendable in accordance with a displacement of the first bearing in the direction orthogonal to the first rotation axis and the second rotation axis.

7. A camera device comprising:
a camera module that captures an image of an object and outputs image data;
an actuator mechanism that rotates the camera module in a plurality of directions; and
an actuator mechanism controller that controls the actuator mechanism,
wherein the actuator mechanism includes:
a driven member having a substantially spherical shape;
a base;
a support member that is provided on the base;
a gimbal frame that is provided on a periphery of the driven member;
a first bearing that couples the gimbal frame to the support member to be rotatable around a first rotation axis;
a second bearing that couples the driven member to the gimbal frame to be rotatable around a second rotation axis that is orthogonal to the first rotation axis;
a plurality of piezoelectric elements, each of which has one end fixed onto the base and the other end disposed to be in contact with an actuation portion that abuts the driven member; and
an elastic portion that is formed on the gimbal frame, the elastic portion being displaceable in a direction orthogonal to the first rotation axis and the second rotation axis.

8. The device according to claim 7 further comprising an image tracking controller that outputs a control signal for controlling a visual line of the camera module to follow a relative movement of the object based on the image data output from the camera module,
wherein the actuator mechanism controller controls the actuator mechanism in accordance with the control signal output from the image tracking controller.

9. The device according to claim 7 further comprising a camera shaking correction controller that outputs a control signal for controlling a rotation amount of the camera module based on at least one of the image data output from the camera module and a vibration of the camera module measured by a sensor,
wherein the actuator mechanism controller controls the actuator mechanism in accordance with the control signal output from the camera shaking correction controller.

10. A camera device comprising:
a camera module that captures an image of an object and outputs image data;
an actuator mechanism that rotates the camera module in a plurality of directions; and
an actuator mechanism controller that controls the actuator mechanism,
wherein the actuator mechanism includes:
a driven member having a substantially spherical shape;
a base;
a support member that is provided on the base;
a gimbal frame that is provided on a periphery of the driven member;
a first bearing that couples the gimbal frame to the support member to be rotatable around a first rotation axis;
a second bearing that couples the driven member to the gimbal frame to be rotatable around a second rotation axis that is orthogonal to the first rotation axis;

a plurality of piezoelectric elements, each of which has one end fixed onto the base and the other end disposed to be in contact with an actuation portion that abuts the driven member; and an elastic portion that is formed on the support member, the elastic portion being displaceable in a direction orthogonal to the first rotation axis and the second rotation axis.

11. The device according to claim 10 further comprising a visual line controller that outputs a control signal for controlling a change in a visual line of the camera module, wherein the actuator mechanism controller controls the actuator mechanism in accordance with the control signal output from the visual line controller.

12. The device according to claim 10 further comprising an image tracking controller that outputs a control signal for controlling a visual line of the camera module to follow a relative movement of the object based on the image data output from the camera module, wherein the actuator mechanism controller controls the actuator mechanism in accordance with the control signal output from the image tracking controller.

13. The device according to claim 10 further comprising a camera shaking correction controller that outputs a control signal for controlling a rotation amount of the camera module based on at least one of the image data output from the camera module and a vibration of the camera module measured by a sensor, wherein the actuator mechanism controller controls the actuator mechanism in accordance with the control signal output from the camera shaking correction controller.

14. The device according to claim 7 further comprising a visual line controller that outputs a control signal for controlling a change in a visual line of the camera module, wherein the actuator mechanism controller controls the actuator mechanism in accordance with the control signal output from the visual line controller.

* * * * *